(12) United States Patent
Baba et al.

(10) Patent No.: US 11,130,468 B2
(45) Date of Patent: Sep. 28, 2021

(54) AIRBAG APPARATUS WITH AN ACTIVE VENT MECHANISM

(71) Applicants: Autoliv Development AB, Vargarda (SE); Yutaka Baba, Kanagawa (JP); Kazuki Morita, Kanagawa (JP)

(72) Inventors: Yutaka Baba, Kanagawa (JP); Kazuki Morita, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 82 days.

(21) Appl. No.: 16/605,687

(22) PCT Filed: Feb. 6, 2018

(86) PCT No.: PCT/JP2018/003917
§ 371 (c)(1),
(2) Date: Oct. 16, 2019

(87) PCT Pub. No.: WO2018/193688
PCT Pub. Date: Oct. 25, 2018

(65) Prior Publication Data
US 2020/0130633 A1 Apr. 30, 2020

(30) Foreign Application Priority Data

Apr. 16, 2017 (JP) ............................. JP2017-080998

(51) Int. Cl.
*B60R 21/239* (2006.01)
*B60R 21/203* (2006.01)
(Continued)

(52) U.S. Cl.
CPC .......... *B60R 21/239* (2013.01); *B60R 21/203* (2013.01); *B60R 21/2338* (2013.01);
(Continued)

(58) Field of Classification Search
CPC ........... B60R 2021/23382; B60R 2021/23384; B60R 2021/2395; B60R 2021/23538;
(Continued)

(56) References Cited

U.S. PATENT DOCUMENTS 6,648,371 B2 * 11/2003 Vendely ................ B60R 21/217
280/739
6,832,778 B2 * 12/2004 Pinsenschaum ...... B60R 21/239
280/739
(Continued)

FOREIGN PATENT DOCUMENTS

JP 2008543656 A 12/2008
JP 2009040260 A 2/2009
(Continued)

OTHER PUBLICATIONS

International Search Report of the International Searching Authority for PCT/JP2018/003917 dated Apr. 24, 2018.
(Continued)

*Primary Examiner* — Laura Freedman
(74) *Attorney, Agent, or Firm* — Stoel Rives LLP

(57) ABSTRACT

An active vent mechanism for an airbag apparatus that includes a first vent hole formed in an airbag and a patch capable of releasing and closing the first vent hole. A portion of the patch is coupled to the outer surface of the airbag. The airbag apparatus includes a coupling member having one end coupled to the patch and the other end entering the airbag and coupled to the airbag. A portion of the patch or a portion of the coupling member penetrates through an opening in the vicinity of the first vent hole. The airbag apparatus includes a substantially cylindrical regulating member into which the coupling member is inserted inside the airbag. The regulating member has a first end coupled to the inner surface of the airbag so as to surround the opening
(Continued)

inside the airbag and a second end coupled to the coupling member in a sealed state.

14 Claims, 6 Drawing Sheets

(51) Int. Cl.
*B60R 21/2338* (2011.01)
*B60R 21/235* (2006.01)
(52) U.S. Cl.
CPC ............ *B60R 2021/2395* (2013.01); *B60R 2021/23382* (2013.01); *B60R 2021/23384* (2013.01); *B60R 2021/23538* (2013.01); *B60R 2021/23557* (2013.01)
(58) Field of Classification Search
CPC ........ B60R 2021/23557; B60R 21/203; B60R 21/2338; B60R 21/239
See application file for complete search history.

(56) References Cited

U.S. PATENT DOCUMENTS

| | | | | |
|---|---|---|---|---|
| 7,328,915 | B2* | 2/2008 | Smith | B60R 21/2338 280/739 |
| 7,419,184 | B2 | 9/2008 | Green et al. | |
| 7,726,685 | B2* | 6/2010 | Abe | B60R 21/233 280/736 |
| 7,857,347 | B2* | 12/2010 | Abe | B60R 21/2338 280/743.2 |
| 7,931,297 | B2* | 4/2011 | Abe | B60R 21/2338 280/739 |
| 8,020,891 | B2* | 9/2011 | Fukawatase | B60R 21/239 280/739 |
| 8,070,183 | B2* | 12/2011 | Kumagai | B60R 21/239 280/743.2 |
| 8,419,054 | B2 | 4/2013 | Abe | |
| 8,491,004 | B2* | 7/2013 | Mendez | B60R 21/2338 280/739 |
| 8,500,166 | B2 | 8/2013 | Inuzuka et al. | |
| 8,590,927 | B2* | 11/2013 | Mendez | B60R 21/2338 280/739 |
| 9,033,362 | B2 | 5/2015 | Fukawatase | |
| 9,403,504 | B2* | 8/2016 | Umehara | B60R 21/239 |
| 9,434,345 | B2* | 9/2016 | Hiruta | B60R 21/2338 |
| 2012/0074677 | A1 | 3/2012 | Hiruta et al. | |

FOREIGN PATENT DOCUMENTS

| | | | | |
|---|---|---|---|---|
| JP | 2009067079 | A * | 4/2009 | ........ B60R 21/2338 |
| JP | 2012066746 | A | 4/2012 | |
| JP | 2013035473 | A | 2/2013 | |
| JP | 2013049322 | A | 3/2013 | |

OTHER PUBLICATIONS

Translation of the International Search Report of the International Searching Authority for PCT/JP2018/003917 dated Apr. 24, 2018.

* cited by examiner

[FIG. 1]
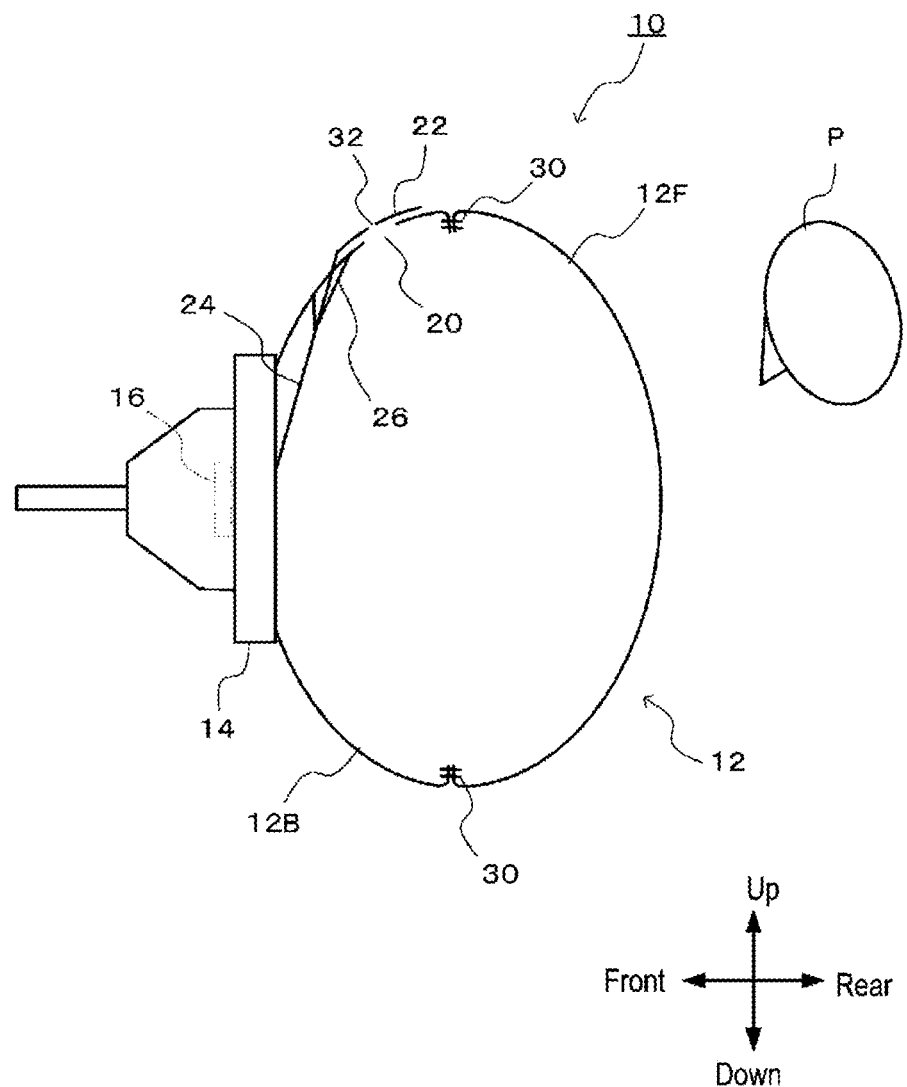

[FIG. 2]
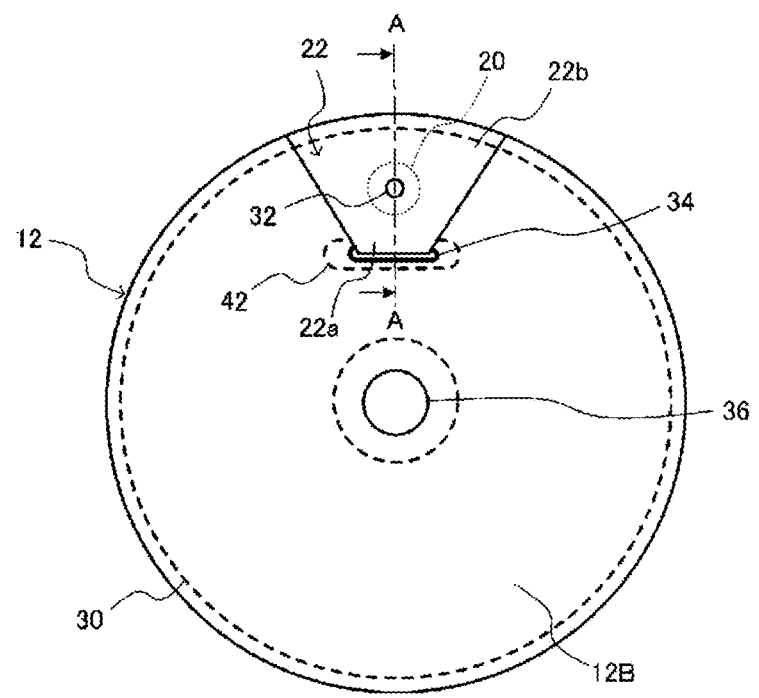
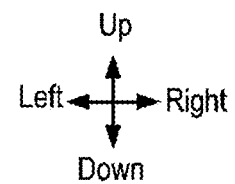

[FIG. 3A]
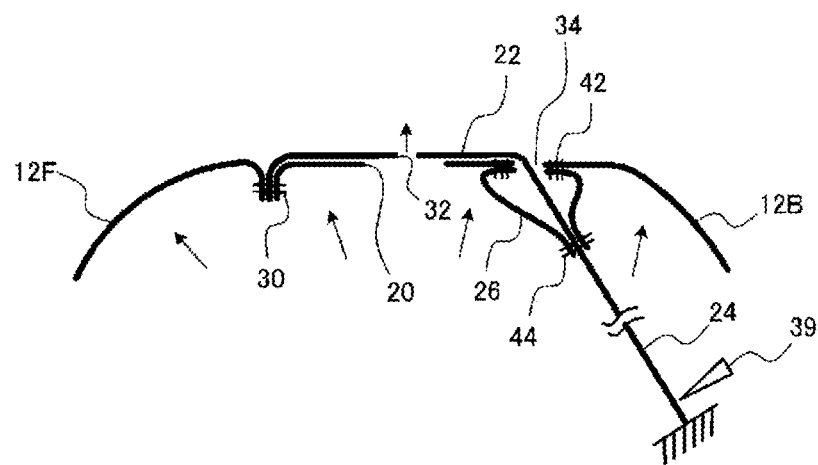
[FIG. 3B]
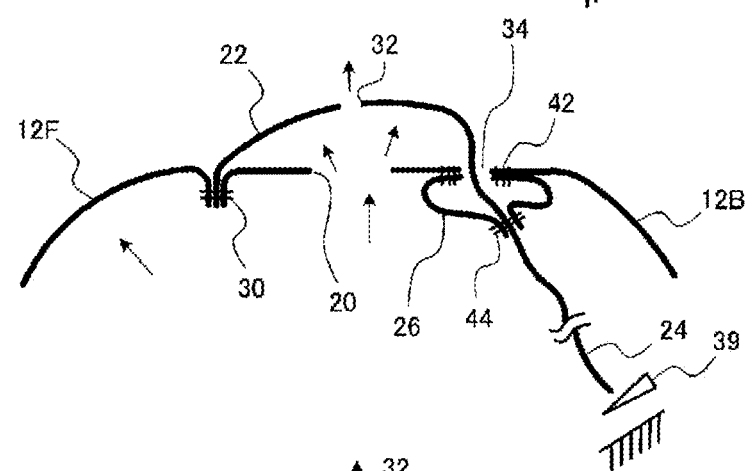
[FIG. 3C]
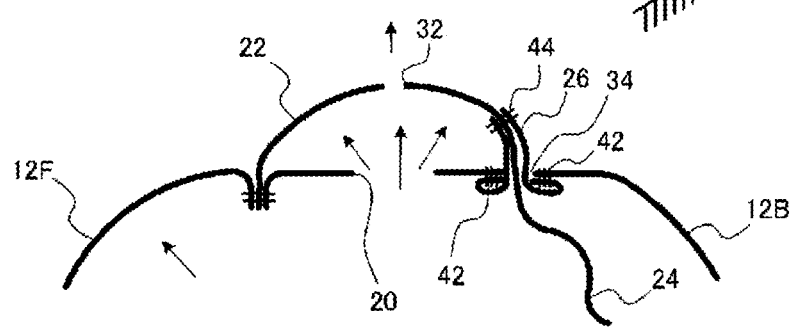

[FIG. 4A]
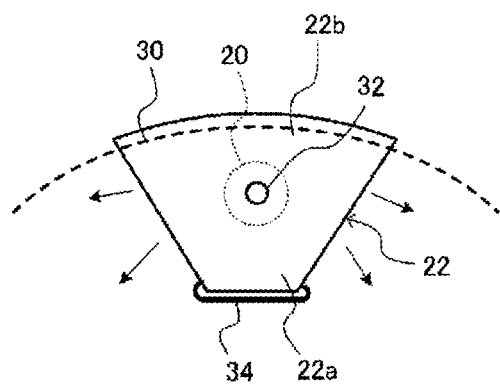
[FIG. 4B]
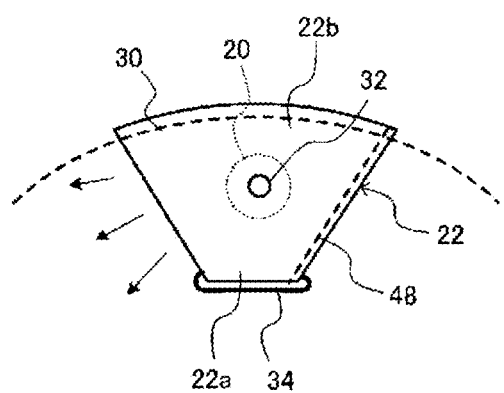

[FIG. 5]
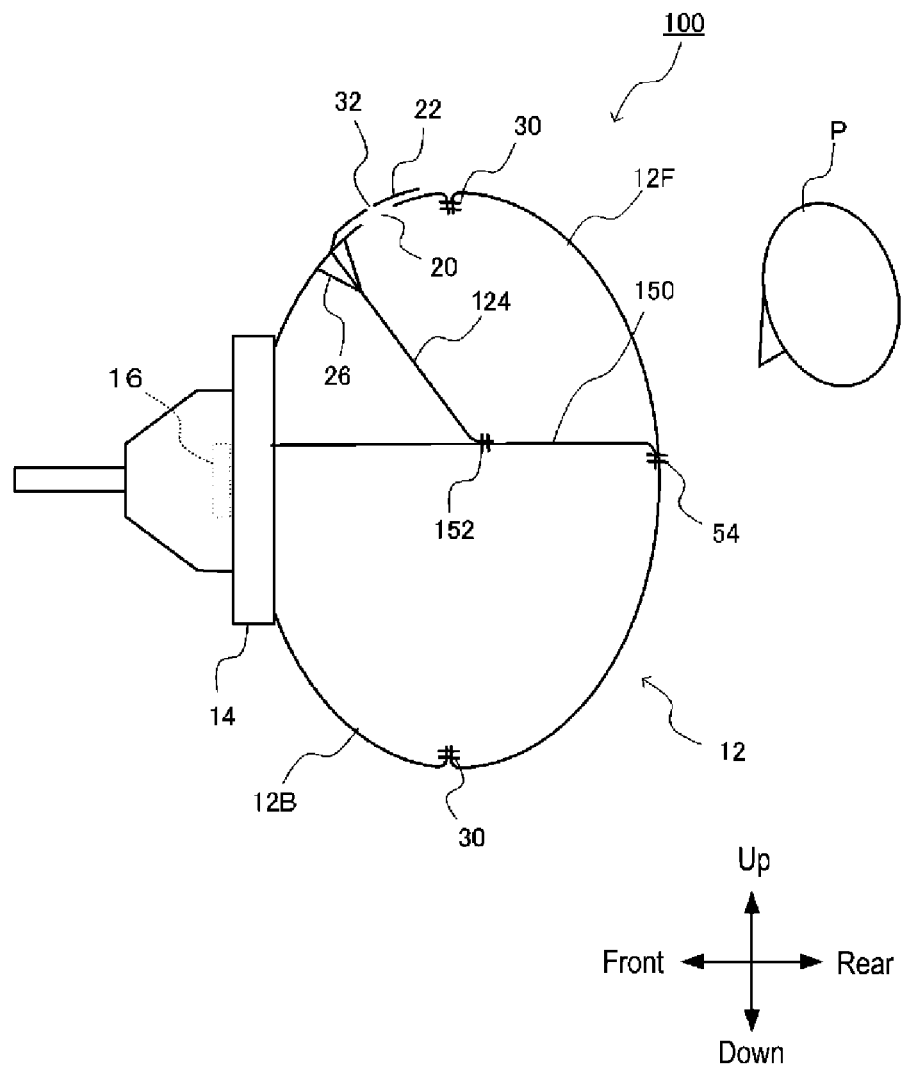

[FIG. 6A]
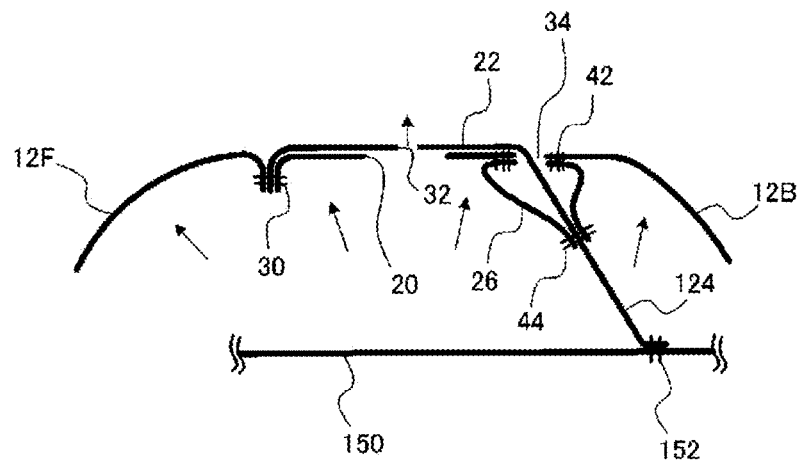
[FIG. 6B]
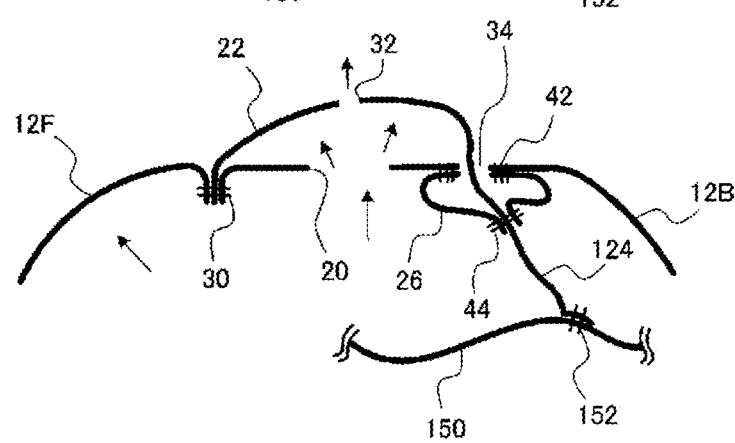
[FIG. 6C]
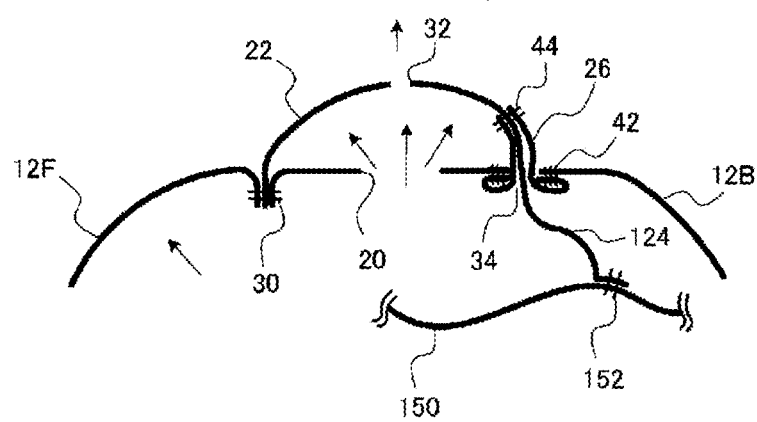

AIRBAG APPARATUS WITH AN ACTIVE VENT MECHANISM

TECHNICAL FIELD

The present invention relates to a vehicle airbag apparatus, specifically to an airbag apparatus employing an active vent mechanism.

BACKGROUND

In order to protect passengers when a vehicle accident occurs, it is well known that vehicles are equipped with one or more airbags. These airbags include, for example, various forms such as: a so-called driver airbag which is expanded from the vicinity of the steering wheel of an automobile so as protect the driver; a curtain airbag which is deployed downward on the inner side of the window of an automobile so as to protect passengers during collisions in the transverse direction of a vehicle, as well as when overturning, and during rollover accidents; and a side airbag apparatus which is deployed on the side (seat side) of passengers so as to protect the passenger upon impact in the transverse direction of a vehicle.

In airbag apparatuses, it is required that the quick deployment of an airbag restrain a passenger and reduce damage to the passenger drawn into this airbag. With that, an active vent mechanism for opening and closing a vent hole in response to the drawing of the passenger into the airbag has been proposed.

In a front airbag apparatus employing the active vent mechanism, the amount of gas discharged from the vent hole is preferably appropriately controlled. Specifically, there is a strong demand for a so-called front airbag apparatus for protecting a passenger in the driver seat or passenger seat which has a strong impact on the head and neck of the passenger.

DISCLOSURE OF THE INVENTION

Problem to be Solved by the Invention

The present invention has been created in view of the abovementioned problem, with an object of providing an airbag apparatus which can appropriately control the amount of gas discharged from a vent hole.

Means for Solving the Problem

In order to achieve the abovementioned object, the airbag apparatus according to the present invention includes: an airbag that restrains a passenger in a vehicle when expanded and deployed; a gas generator for generating expansion gas which expands and deploys the airbag; and an active vent mechanism which is provided in the airbag and is capable of discharging gas inside the airbag.

The active vent mechanism includes: a first vent hole formed in the airbag; a patch capable of releasing and closing the vent hole in accordance with the internal pressure of the airbag, with a portion of the patch coupled to the outer surface of the airbag; a coupling member having one end coupled to the patch, with the other end entering the airbag and coupled to the airbag; an opening provided in the vicinity of the first vent hole, with a portion of the patch or a portion of the coupling member penetrating through the opening; a substantially cylindrical regulating member into which the coupling member is inserted inside the airbag, wherein the airbag regulating member has: a first end coupled to the inner surface of the airbag so as to surround the opening inside the airbag, and a second end coupled to the coupling member in the sealed state; and a releasing means for reducing the tension of the coupling member.

In addition, when the airbag is fully deployed, the patch is operable so as to block the first vent hole via the tension of the coupling member, while when the releasing means reduces the tension of the coupling member, the patch is operable so as to be separated from the outer surface of the airbag and thereby induce discharge from the first vent hole.

Here, "substantially cylindrical" may mean tubular with both ends released in the state prior to coupling and may be exemplified by a flat triangular pyramid state when actually coupled to the inner surface of the airbag and the coupling member. Moreover, the "sealed state" means a state in which almost no gas leaks from this coupling part.

According to the present invention having the abovementioned configuration, in a state immediately after the airbag is fully deployed, the tension of the coupling member and the regulating member allows the patch to block the first vent hole, making it possible to prevent the unfavorable leakage of expansion gas. Gas leakage positions exist mainly on the periphery of the first vent hole as well as on the periphery of the opening, allowing gas leakage to be appropriately suppressed or prevented at any position.

Moreover, by adjusting the size and shape of the regulating member, the amount of gas discharged from the first vent hole can be appropriately controlled. For example, if the regulating member is extended along the coupling member, the rate (movable region) at which the patch rises is spread out, consequently enabling a large amount of gas to be discharged from the first vent hole. Conversely, if the regulating member is reduced (shortened), the movable region of the patch decreases, causing the discharge amount of gas to also decrease. In this way, the discharge amount of gas can be appropriately controlled depending on the design of the regulating member.

Further, by adjusting the shape of the patch itself, along with the coupling (sewing) range to the outer surface of the airbag, the discharge amount of gas can be controlled. If the coupling range of the patch decreases, when the patch is separated from the airbag, the gap between this patch and the first vent hole increases, allowing a large amount of gas to be discharged from this gap. In contrast, even with a patch having the same size and the same shape, if the coupling range (fixed range) is increased, when the patch is separated from the airbag, the gap between this patch and the first vent hole decreases, suppressing the discharge amount of gas.

The releasing means can be configured so as to fracture the other end of the coupling member. For example, a mechanically or electrically operable cutter can be used.

The timing to reduce (release) the tension of the coupling member is arbitrary, such that, for example, when the relative collision speed of the vehicle is high, that is, when the Gs upon a collision are high and a passenger has a large physique (heavy weight), the release of the coupling member is preferably delayed. In this case, the release timing of the coupling member is determined based on the detection results of the seat slide amount (seat position) and/or the mass (weight) of the passenger occupying the seat.

A tether regulating the deployed shape of the airbag can be provided inside the airbag, with one end of the tether coupled to the passenger side, while the other end of the tether is coupled to the inflator side. In addition, it can be configured such that the other end of the coupling member is coupled to the tether, such that a reduction in the tension of the tether causes a reduction in the tension of the coupling member. In this case, because the reduction in the tension of the tether itself functions as the releasing means, the releasing means as another member can be omitted.

The coupling member can be integrally molded with the patch or configured as a separate body. If the coupling member is a member separate from the patch, it can be a band shaped member coupled to the patch.

A second vent hole can be formed in the patch. Here, the second vent hole can be formed so as to overlap the position facing the first vent hole. Moreover, the second vent hole preferably has a smaller opening area than the first vent hole.

The opening can be slit shaped. A gap which enables the end of the patch or the coupling member to slide is sufficient.

If an edge part of the patch on the opening side is a proximal edge part, while the opposite side facing the proximal edge part is a distal edge part, at least the distal edge part can be coupled to the outer surface of the airbag. Alternatively, a portion of a side edge part thereof (which couples the proximal edge part and the distal edge part) can be coupled to the outer surface of the airbag.

Such ingenuity makes it possible to regulate the discharge amount of gas per unit time, along with the direction of discharging gas. At least the maximum gas discharge amount per unit time can be relatively easily grasped.

The airbag can be molded by coupling a front panel (which is disposed on the passenger side when expanded and deployed) to an outer edge part of a back panel (which is disposed on the opposite side of the passenger) via an outer peripheral sewing part. At this time, the distal edge part of the patch can be configured so as to be coupled to the airbag via the outer peripheral sewing part.

The present invention is particularly effective in a driver airbag housed in a steering wheel, wherein the driver airbag significantly limits the housing space and may significantly deteriorate the injury criteria of the passenger. That is, the airbag apparatus according to the present invention has a simple and compact configuration, while allowing the discharge thereof to be appropriately controlled.

BRIEF DESCRIPTION OF THE DRAWINGS

FIG. 1 is a side view (cross sectional view) schematically illustrating a deployed state of a driver airbag apparatus according to an example of the present invention.

FIG. 2 is a front view illustrating the deployed state of an airbag of the driver airbag apparatus according to Example 1 of the present invention, in addition to illustrating the appearance seen from the steering wheel side (opposite side of a passenger).

FIG. 3 is a cross sectional view in the A-A direction of FIG. 2, illustrating the structure of the periphery of an active vent of the driver airbag apparatus according to Example 1 of the present invention, wherein (A) represents the state in which the active vent is closed, (B) represents the state in which the active vent starts to open, and (C) represents the state in which the active vent is maximally opened.

FIGS. 4(A) and (B) are plan views illustrating the structure of the periphery of the active vent of the driver airbag apparatus according to the present invention.

FIG. 5 is a side view (cross sectional view) schematically illustrating the deployed state of a driver airbag apparatus according to Example 2 of the present invention.

FIG. 6 is a cross sectional view in the A-A direction of FIG. 2, illustrating the structure of the periphery of an active vent of the driver airbag apparatus according to Example 2 of the present invention, wherein (A) represents the state in which the active vent is closed, (B) represents the state in which the active vent starts to open, and (C) represents the state in which the active vent is maximally opened.

DESCRIPTION OF THE PREFERRED EMBODIMENT

The driver airbag apparatus according to the embodiments of the present invention will be described with reference to the accompanying drawings. Note that "front" displayed in each figure denotes the front (traveling direction) of a vehicle, "rear" denotes the rear (on the side opposite the traveling direction) of the vehicle, "inside" denotes the center side in the vehicle width direction (on the passenger side), and "outside" denotes the outside in the vehicle width direction (on the door panel side).

Example 1

FIG. 1 is a side view (cross sectional view) schematically illustrating the deployed state of a driver airbag apparatus 10 according to Example 1 of the present invention. FIG. 2 is a front view illustrating the deployed state of an airbag 12 of the driver airbag apparatus 10 according to Example 1 of the present invention, in addition to illustrating the appearance seen from the steering wheel 14 side (opposite side of passenger P). FIG. 3 is a cross sectional view illustrating the structure of the periphery of an active vent 20 of the driver airbag apparatus 10 according to Example 1 of the present invention, wherein (A) illustrates the state in which the active vent 20 is closed, (B) illustrates the state in which the active vent 20 starts to open, and (C) illustrates the state in which the active vent 20 is maximally opened.

The airbag apparatus 10 according to Example 1 of the present invention includes: an airbag 12 that restrains passenger P in a vehicle when expanded and deployed; an inflator 16 for generating expansion gas which expands and deploys the airbag 12; and active vent mechanisms (20, 22, 24, 26, 34) which are provided in the airbag 12 and are capable of discharging gas inside this airbag 12. The airbag 12 including the active vent mechanisms, along with the inflator 16, is housed in the steering wheel 14.

The active vent mechanisms (20, 22, 24, 26, 34) include: a first vent hole 20 formed in the airbag 12; a patch 22 which releases and closes a vent hole 20 in accordance with the internal pressure of the airbag 12, with a portion of the patch 22 coupled to the outer surface of the airbag 12; a coupling member 24 having one end coupled to the patch 22, with the other end entering the airbag 12 and coupled to the structure on the periphery of the inflator 16; a slit shaped opening 34 provided in the vicinity of the first vent hole 20, with a portion of the patch 22 or a portion of the coupling member 24 penetrating through the opening 34; a substantially cylindrical regulating member 26 into which the coupling member 24 is inserted inside the airbag 12; and a releasing means 39 for reducing the tension of the coupling member 24 at any timing (see FIG. 3).

The regulating member 26 has: an upper end which is coupled to the inner surface of this airbag 12 so as to surround the opening 34 inside the airbag 12; and a lower end which is coupled to the coupling member 24 in the sealed state. The regulating member 26 is molded, for example, of the same flexible cloth as in the airbag 12, into a cylindrical shape and fixed to the airbag 12 (12B) via sewing 42 (see FIG. 3) on the periphery thereof such that one end thereof covers the opening 34. The lower end of the regulating member 26 is coupled by sewing 44 (see FIG. 3)

so as to be fully fixed to the coupling member 24. Consequently, in the sewing 44 part, the regulating member 26 and the coupling member 24 operate together.

The first vent hole 20 is not necessarily limited to one, with multiple first vent holes 20 capable of being formed.

If an edge part of the patch 22 on the opening 34 side is a proximal edge part 22a, while the opposite side facing this proximal edge part 22a is a distal edge part 22b, at least the distal edge part 22b is coupled to the outer surface of the airbag 12 (12B). Moreover, a second vent hole 32 is formed in the patch 22 so as to overlap the position facing the first vent hole 20. This second vent hole 32 has a smaller opening area than the first vent hole 20 and continuously discharges gas little by little. Note that the second vent hole 32 can be omitted.

The patch 22 is preferably made of, for example, a flexible fabric of the same material as the airbag. As illustrated in FIG. 2, in the present example, the shape of the patch 22 resembles a fan or trapezoid shape. The narrow proximal edge part 22a can smoothly slide inside the opening 34, while the wide distal edge part 22b can cover the first vent hole 20 within a wide range. Note that the shape of the patch 22 can be appropriately changed in accordance with the formation position and size of the first vent hole 20, along with the gas discharge properties.

As illustrated in FIG. 1, the airbag 12 is molded by coupling a front panel 12F (which is disposed on the passenger P side when expanded and deployed) to an outer edge part of a back panel 12B (which is disposed on the opposite side of passenger P) via an outer peripheral sewing part 30. At this time, as illustrated in FIG. 2, the distal edge part 22b of the patch 22 is coupled to the back panel 12B via the outer peripheral sewing part 30.

The coupling member 24 can be integrally molded with the patch 22. In this case, molding can be carried out such that the width gradually decreases from the proximal edge part 22a of the patch 22 to the inside of the airbag 12, or the width is fixed halfway. Moreover, as another method, the patch 22 and the coupling member 24 can be configured as separate bodies. The coupling member 24 can be a flexible band shaped member and, for example, coupled to the proximal edge part 22a of the patch 22 via sewing.

The releasing means fractures the other end of the coupling member 24, with, for example, a mechanically or electrically operable cutter 39 capable of being used.

Operation of Example 1

As illustrated in FIG. 3(A), in the state immediately after the airbag 12 is fully deployed when a collision accident, etc. occurs, the tension of the coupling member 24 forces the patch 22 to adhere to the airbag 12 so as to block the first vent hole 20. Therefore, only a small amount of gas is discharged from the second vent hole 32.

As illustrated in FIG. 3(B), the rear end of the coupling member 24 is cut via the releasing means (cutter) 39 at any timing. Hence, when the tension of the coupling member 24 is reduced, the patch 22 separates from the outer surface of the airbag 12 so as to initiate discharge from the first vent hole 20. The gas discharged from the first vent hole 20 contacts the patch 22 and is then discharged from both the left and right sides of the patch 22 to the outside.

Here, as an arbitrary timing at which an opening means 39 operates, for example, when the relative collision speed of the vehicle is high, that is, when the Gs upon a collision are high and a passenger has a large physique (heavy weight), the release of the coupling member is preferably delayed. In this case, the release timing of the coupling member is determined based on the detection results of the seat slide amount (seat position) and/or the mass (weight) of the passenger occupying the seat.

Subsequently, as illustrated in FIG. 3(C), the internal pressure of the airbag 12 allows the regulating member 26 in a reversed state to protrude from the opening 34 to the outside of the airbag 12, but allows the regulating member 26 which is fully protruding to no longer move outside. At this time, with the patch 22 inflated like a paraglider, expansion gas is discharged from both released sides. In this way, at the time when the patch 22 reaches a certain position, because the patch 22 no longer rises, the discharge amount of the expansion gas can be easily predicted.

The amount of gas discharged from the airbag 12 can generally be adjusted by the opening area of the first vent hole 20, but can also be adjusted by the size and shape of the regulating member 26, in addition to the opening area of the first vent hole 20. For example, if the regulating member 26 is extended along the coupling member 24, the movable region in which the patch 22 rises is spread out, consequently enabling a large amount of gas to be discharged from the first vent hole 20. Conversely, if the regulating member 26 is reduced (shortened), the movable region of the patch 22 decreases, causing the discharge amount of gas to also decrease. In this way, the discharge amount of gas can be appropriately controlled depending on the design of the regulating member 26.

Moreover, in the state (A) immediately after the airbag 12 is fully deployed, the tension of the coupling member 26 allows the patch 22 to block the first vent hole 20, making it possible to prevent the unfavorable (unexpected) leakage of expansion gas. Gas leakage positions exist mainly on the periphery of the first vent hole 20 as well as on the periphery of the opening 34, allowing gas leakage to be appropriately suppressed or prevented at any position.

(Patch Variation)

FIGS. 4(A) and (B) are plan views illustrating the structure of the periphery of the active vent of the driver airbag apparatus according to the present invention. The above-mentioned patch 22 is illustrated in FIG. 4(A). As illustrated in FIG. 4(A), only the distal edge part 22b of the patch 22 is fixed to the airbag 12 via sewing 30, with the gas discharged from the first vent hole 20 discharged from both the left and right sides of the patch 22.

In the example illustrated in FIG. 4(B), the distal edge part 22b of the patch 22, as well as one side edge part, is coupled and fixed via sewing 48. As a result, the gas discharged from the first vent hole 20 is only discharged from the left of the patch 22. Consequently, compared with the example illustrated in FIG. 4(A), the discharge amount of gas per unit time is small.

In this way, by adjusting the shape of the patch 22, as well as the coupling (sewing) range to the outer surface of the airbag 12, the discharge amount of gas can be controlled. Again, as illustrated in FIG. 4(A), if the coupling range of the patch 22 is decreased, when the patch 22 is separated from the airbag 12, the gap between this patch 22 and the first vent hole 20 increases, allowing a large amount of gas to be discharged from this gap. In contrast, as illustrated in FIG. 4(B), if the coupling range of the patch 22 to the airbag 12 is increased, when the patch 22 is separated from the airbag 12, the gap between this patch 22 and the first vent hole 20 decreases, suppressing the discharge amount of gas.

Example 2

FIG. 5 is a side view (cross sectional view) schematically illustrating the deployed state of a driver airbag apparatus 100 according to Example 2 of the present invention. FIG. 6 is a cross sectional view in the A-A direction of FIG. 2, illustrating the structure of the periphery of an active vent of the driver airbag apparatus 100 according to Example 2 of the present invention, wherein (A) represents the state in which the active vent is closed, (B) represents the state in which the active vent starts to open, and (C) represents the state in which the active vent is maximally opened. In the present example, components identical or corresponding to those of the abovementioned Example 1 are labeled with identical symbols, with redundant descriptions thereof omitted.

In the present example, a tether 150 regulating the deployed shape of this airbag 12 can be provided inside the airbag 12, with one end of the tether 150 coupled to the passenger P side, while the other end of the tether 150 is coupled to the structure on the periphery of an inflator 16. The end of a coupling member 124 is coupled to a portion of the tether 150 via a sewing part 152.

In addition, a reduction in the tension of the tether 150 causes a reduction in the tension of the coupling member 124. In this case, because the reduction in the tension of the tether 150 itself functions as the releasing means, the releasing means such as a cutter as another structure can be omitted. However, a cutter for cutting the tether 150 can be separately provided.

Operation of Example 2

As illustrated in FIG. 6(A), in the state immediately after the airbag 12 is fully deployed when a collision accident, etc. occurs, the tension of the coupling member 124 forces the patch 22 adhere to the airbag 12 so as to block the first vent hole 20. Therefore, only a small amount of gas is discharged from the second vent hole 32.

As illustrated in FIG. 6(B), when the drawing of passenger P into the airbag 12, etc. loosens the tether 150, the tension of the coupling member 124 decreases and the patch 22 is separated from the outer surface of the airbag 12 so as to initiate discharge from the first vent hole 20. The gas discharged from the first vent hole 20 contacts the patch 22 and is then discharged from the gap between the patch 22 and the airbag 12 to the outside.

Subsequently, as illustrated in FIG. 6(C), the internal pressure of the airbag 12 allows the regulating member 26 in a reversed state to protrude from the opening 34 to the outside of the airbag 12, but allows the regulating member 26 which is fully protruding to no longer move outside. At this time, as in Example 1, with the patch 22 rising (inflated) like a paraglider, the expansion gas is discharged from both opened sides. In this way, at the time when the patch 22 reaches a certain position, because the patch 22 no longer rises, the discharge amount of the expansion gas can be easily predicted.

While examples of the present invention have been described thus far, the present invention is in no way limited by these examples and may be changed as long as they are included in the category of technical ideas indicated in the Scope of the Patent Claims.

The invention claimed is:
1. An airbag apparatus, comprising:
an airbag configured to restrain a passenger in a vehicle when expanded and deployed;
a gas generator for generating expansion gas which expands and deploys the airbag; and
an active vent mechanism which is provided in the airbag and is capable of discharging gas from inside the airbag;
wherein the active vent mechanism comprises:
a first vent hole formed in the airbag;
a patch capable of releasing and closing the first vent hole in accordance with an internal pressure of the airbag, with a portion of the patch coupled to an outer surface of the airbag;
a coupling member having one end coupled to the patch, with the other end entering the airbag and coupled to the airbag;
an opening provided in the vicinity of the first vent hole, with a portion of the patch or a portion of the coupling member penetrating through the opening;
a substantially cylindrical regulating member into which the coupling member is inserted inside the airbag, wherein the regulating member has: a first end coupled to an inner surface of the airbag so as to surround the opening inside the airbag; and a second end coupled via stitching to the coupling member in a sealed state; and
a releasing means for reducing tension of the coupling member;
wherein, when the airbag is fully deployed, the patch is operable so as to block the first vent hole via the tension of the coupling member, while when the releasing means reduces the tension of the coupling member, the patch is operable so as to be separated from the outer surface of the airbag and thereby induce discharge from the first vent hole.

2. The airbag apparatus according to claim 1, wherein the releasing means is configured so as to fracture the other end of the coupling member.

3. The airbag apparatus according to claim 1, configured such that a tether regulating a deployed shape of the airbag is provided inside the airbag, wherein:
one end of the tether is coupled to a passenger side, while the other end of the tether is coupled to an inflator side,
the other end of the coupling member is coupled to the tether, and
a reduction in tension of the tether causes a reduction in the tension of the coupling member.

4. The airbag apparatus according to claim 1, wherein the coupling member is integrally molded with the patch.

5. The airbag apparatus according to claim 1, wherein the coupling member is a band shaped member which is configured as a body separate from the patch and coupled to the patch.

6. The airbag apparatus according to claim 1, wherein a second vent hole is formed in the patch.

7. The airbag apparatus according to claim 6, wherein the second vent hole is formed so as to overlap a position facing the first vent hole.

8. The airbag apparatus according to claim 6, wherein the second vent hole has a smaller opening area than the first vent hole.

9. The airbag apparatus according to claim 1, wherein the opening is slit shaped.

10. The airbag apparatus according to claim 1, wherein an edge part of the patch on an opening side is a proximal edge part, while the opposite side facing the proximal edge part is a distal edge part, and wherein at least the distal edge part is coupled to the outer surface of the airbag.

11. The airbag apparatus according to claim 10, wherein, in addition to the distal edge part of the patch, a portion of a side edge part thereof, which couples the proximal edge part and the distal edge part, is coupled to the outer surface of the airbag.

12. The airbag apparatus according to claim 1, wherein the airbag is molded by coupling a front panel, which is disposed on a passenger side when expanded and deployed, to an outer edge part of a back panel, which is disposed on the opposite side of the passenger, via an outer peripheral sewing part.

13. The airbag apparatus according to claim 12, wherein the distal edge part of the patch is coupled to the airbag via the outer peripheral sewing part.

14. The airbag apparatus according to claim 1, wherein the airbag is a driver airbag housed in a steering wheel.

\* \* \* \* \*